United States Patent
Lee et al.

(10) Patent No.: US 9,104,060 B2
(45) Date of Patent: Aug. 11, 2015

(54) LIQUID CRYSTAL DISPLAY PANEL AND LIQUID CRYSTAL DISPLAY DEVICE CONTAINING THE SAME

(71) Applicant: InnoLux Corporation, Miao-Li County (TW)

(72) Inventors: Yung-Ching Lee, Miao-Li County (TW); Chia-Sen Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/168,083

(22) Filed: Jan. 30, 2014

(65) Prior Publication Data

US 2014/0253850 A1   Sep. 11, 2014

(30) Foreign Application Priority Data

Mar. 7, 2013   (TW) .............................. 102108040 A

(51) Int. Cl.
*G02F 1/1335*   (2006.01)
*G02F 1/1362*   (2006.01)

(52) U.S. Cl.
CPC .... *G02F 1/133512* (2013.01); *G02F 1/136227* (2013.01); *G02F 2001/136222* (2013.01)

(58) Field of Classification Search
USPC ................................................. 349/106, 110
See application file for complete search history.

(56) References Cited

U.S. PATENT DOCUMENTS

| | | | |
|---|---|---|---|
| 7,394,510 B2 | 7/2008 | Oh et al. | |
| 8,890,187 B2 * | 11/2014 | Arasawa | ......................... 257/98 |
| 2008/0068537 A1 | 3/2008 | Lee et al. | |
| 2012/0162557 A1 | 6/2012 | Nakazawa | |
| 2012/0281172 A1 | 11/2012 | Park et al. | |

FOREIGN PATENT DOCUMENTS

CN   101666937 B   2/2011

* cited by examiner

*Primary Examiner* — Lucy Chien
(74) *Attorney, Agent, or Firm* — Bacon & Thomas, PLLC

(57) ABSTRACT

A liquid crystal display panel is disclosed, which comprises: a first substrate with a metal layer formed thereon; a first passivation layer, formed on the metal layer; a color filter layer with a first opening, disposed on the first passivation layer; a first electrode, formed on the color filter layer; a second passivation layer with a second opening, disposed on the first electrode layer and covering partial sidewall of the first opening, wherein the second opening corresponds to the first opening to expose the metal layer; a second electrode layer disposed on the second passivation layer and electrically connecting to the metal layer; a second substrate opposite to the first substrate; and a light-shielding layer, disposed between the first substrate and the second substrate and comprising a filling part, wherein the filling part is disposed in the second opening and covers the exposed color filter layer.

18 Claims, 9 Drawing Sheets

LIQUID CRYSTAL DISPLAY PANEL AND LIQUID CRYSTAL DISPLAY DEVICE CONTAINING THE SAME

CROSS REFERENCE TO RELATED APPLICATION

This application claims the benefits of the Taiwan Patent Application Serial Number 102108040, filed on Mar. 7, 2013, the subject matter of which is incorporated herein by reference.

BACKGROUND OF THE INVENTION

1. Field of the Invention

The present invention relates to a liquid crystal display panel and a liquid crystal display device containing the same and, more particularly, to a liquid crystal display panel with high aperture ratio and a liquid crystal display device containing the same.

2. Description of Related Art

In recent years, liquid crystal display (LCD) devices are developed toward having small volume, thin thickness and light weight as the display techniques progresses. The LCD can be applied to various fields. For example, the daily used devices such as cell phones, notebooks, video cameras, cameras, music players, navigation devices, and televisions. The LCD device mainly comprises a LCD panel and a backlight module.

However, the conventional LCD panel is mainly formed by assembling the bottom substrate with TFTs (TFT side) and the upper substrate with the color filter (CF side), wherein both the bottom substrate and the upper substrate are patterned. A broader light-shielding layer such as black matrix has to be used to prevent the light leakage caused by the assembly shift. The broader light-shielding layer may reduce the aperture ratio, which leads to the light transmission rate reduced.

Therefore, it is desirable to provide a LCD panel which can solve the aforementioned problem of the assembly shift and have improved aperture ratio, in order to be applied to small and medium display devices.

SUMMARY OF THE INVENTION

An object of the present invention is to provide a liquid crystal display (LCD) panel and a liquid crystal display device containing the same, which has improved aperture ratios and can be applied to small and medium display devices.

To achieve the object, the liquid crystal display panel of the present invention comprises: a first substrate with a metal layer formed thereon; a first passivation layer disposed on the metal layer; a color filter layer disposed on the first passivation layer and having a first opening; a first electrode layer disposed on the color filter layer; a second passivation layer disposed on the first electrode layer and covering partial sidewall of the first opening of the color filter layer, wherein the second passivation layer has a second opening corresponding to the first opening to expose the metal layer; a second electrode layer disposed on the second passivation layer, covering a sidewall of the second opening of the second passivation layer, and electrically connecting to the metal layer; a second substrate opposite to the first substrate; and a light-shielding layer comprising a filling part and a supporting part, and disposed between the first substrate and the second substrate, wherein the filling part is disposed in the second opening of the second passivation layer and covers the color filter layer exposed from the second passivation layer and the second electrode, and the supporting part is disposed between the second substrate and the first or second passivation layer to form a space therebetween for disposing liquid crystals therein.

Furthermore, the present invention also provides a liquid crystal display (LCD) device comprising the aforementioned LCD panels. The LCD device of the present invention may further comprise: a backlight module disposed under the LCD panel (i.e. a side of the first substrate); and a driving unit. The backlight module and the driving unit can be any backlight module and driving unit generally used in the art, so the description thereto is omitted herein.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

Figure 1:
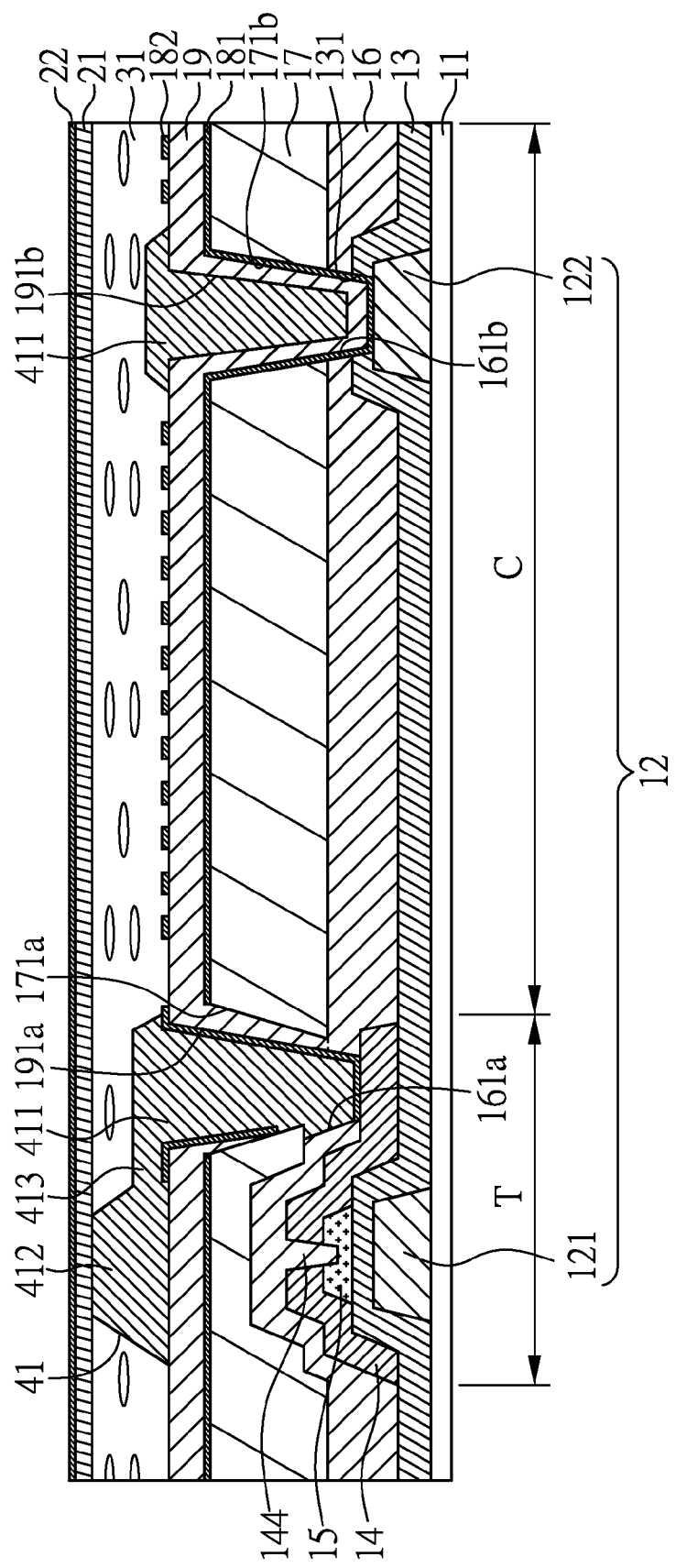
FIG. 1 is a cross-sectional view of an LCD panel according to Embodiment 1 of the present invention.

As shown in FIG. 1, the LCD panel of the present embodiment comprises: a first substrate 11 with a patterned second metal layer 14 formed thereon, wherein the second metal layer 14 is used as a source electrode and, a drain electrode; a first passivation layer 16 disposed on the second metal layer 14, wherein the first passivation layer 16 has a first opening 161a to expose partial second metal layer 14 using as a connecting ring; a color filter layer 17 disposed on the first passivation layer 16 and having a first opening 171a corresponding to the first opening 161a of the first passivation layer 16; a patterned first electrode layer 181 disposed on the color filter layer 17, wherein the patterned first electrode layer 181 is disconnected with the second metal layer 14; a second passivation layer 19 disposed on the first electrode layer 181 and covering partial sidewall of the first opening 171a of the color filter layer 17, wherein the second passivation layer 19 has a first opening 191a corresponding to the first opening 161a of the first passivation layer 16 and the first opening 171a of the color filter layer 17 to expose parts of the second metal layer 14; a patterned second electrode layer 182 disposed on the second passivation layer 19, covering a sidewall of the first opening 191a of the second passivation layer 19 and parts of the sidewall of the first opening 161a of the first passivation layer 16, and electrically connecting to the second metal layer 14, wherein the second electrode layer 182 is electrically separated from the first electrode layer 181; a second substrate 21 opposite to the first substrate 11; and a light-shielding layer 41 comprising a filling part 411 and a supporting part 412, and disposed between the first substrate 11 and the second substrate 21, wherein the filling part 411 is disposed in the first opening 191a of the second passivation layer 19, and an area of the filling part 411 is larger than that of the first opening 191a of the second passivation layer 19 to cover the first opening 191a of the second passivation layer 19 and the exposed layers such as the exposed parts of the color filter layer 17, the first passivation layer 16 or the second electrode layer 182. In other words, the filling part 411 can fill the first opening 161a of the first passivation layer 16, the first opening 171a of the color filter layer 17 and the first opening 191a of the second passivation layer 19. In addition, the supporting part 412 is disposed between the second passivation layer 19 and the second substrate 21 to form a predetermined space 31 therebetween for disposing liquid crystals therein, and a height of the predetermined space 31 is a cell gap. A connecting part 413 can be selectively disposed between the filling part 411 and the supporting part 412 and cover electrode traces.

Hereinafter, a detail structure of the LCD panel of the present embodiment is described. As shown in FIG. 1, the LCD panel of the present embodiment further comprises an active element region T, which comprises: a gate electrode 121 formed by a patterned first metal layer 12, an insulating layer 13 (i.e. gate insulating layer), a patterned semiconductor layer 15, and a source and drain electrode layer formed by a patterned second metal layer 14, wherein the first metal layer 12 is disposed on the first substrate 11, the insulating layer 13 is disposed on the first substrate 11 and covers the gate electrode 121 of the first metal layer 12, the semiconductor layer 15 is disposed on the insulating layer 13, and a second metal layer 14 is disposed on the semiconductor layer 15. Herein, a gap is formed between the source electrode and the drain electrode of the second metal layer 14 to define a channel region 144. To this step, a main structure of a thin film transistor (TFT) is obtained. Herein, each layer in the active element region T can be formed by any conventional process for TFT, so the description thereof is omitted herein.

In addition, as shown in FIG. 1, the first metal layer 12 further comprise a connecting electrode 122 in a display region C, and the connecting electrode 122 provides a common voltage signal to the first electrode layer 181. Furthermore, the insulating layer 13 also covers the connecting electrode 122 when the insulating layer 13 in active element region T is formed.

Figure 2:
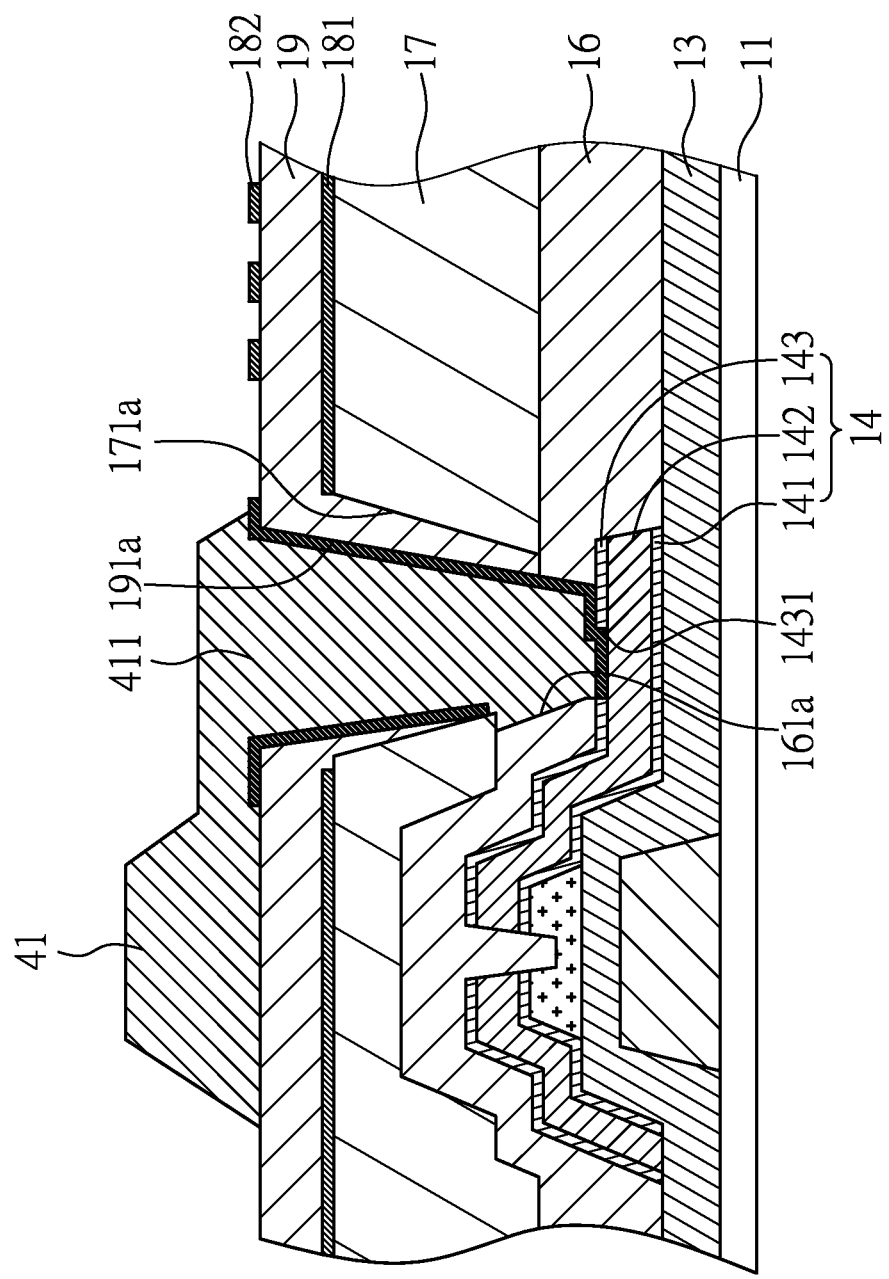
FIG. 2 is a cross-sectional view of an LCD panel according to Embodiment 1 of the present invention.

In the present embodiment, the first substrate 11 is used as a bottom substrate, which can be a glass substrate, a plastic substrate, a silicon substrate, a ceramic substrate, or any conventional bottom substrate generally used in the art. In addition, materials of the first metal layer 12 and the second metal layer 14 can respectively be any conductive material generally used in the art, such as metals, alloys, metal oxides, metal oxynitrides, or other common electrode material used in the art. Preferably, the materials of the first metal layer 12 and the second metal layer 14 are respectively metals. In particular, the second metal layer 14 can have a three-layered structure comprising a MoN layer 141, an Al layer 142, and a MoN layer 143, as shown in FIG. 2. However, in other embodiments of the present invention, the first metal layer 12 and the second metal layer 14 may be respectively formed by a single metal material such as Cu. Furthermore, a material for the insulating layer 13 can be any gate insulating material generally used in the art, such as SiNx or SiOx.

After the TFT in the active element region T is formed, a surface of the second metal layer 14 is covered with a first passivation layer 16, as shown in FIG. 1. Herein, the first passivation layer 16 also covers the insulating layer 13 both in the display region C and on the connecting electrode 122. After the conventional patterning process used in the art, a first opening 161a and a second opening 161b of the first passivation layer 16 are formed, and an insulator opening 131 is formed in the insulating layer 13. The first opening 161a of the first passivation layer 16 is located in the active element region T and corresponds to the source and drain electrode of the second metal layer 14. The second opening 161b of the first passivation layer 16 and the insulator opening 131 is located in the display region C and corresponds to the connecting electrode 122. Preferably, the bottom area (diameter) of the second opening 161b of the first passivation layer 16 is equal to or larger than the top area (diameter) of the insulator opening 131, and the axes of the insulator opening 131 and the second opening 161b of the first passivation layer 16 substantially overlap with each other. Herein, the insulator opening 131 and the second opening 161b of the first passivation layer 16 can be formed simultaneously.

After the first passivation layer 16 and the openings are formed, a color filter layer 17 is formed on the first passivation layer 16. Similarly, after the conventional patterning process used in the art, a first opening 171a and a second opening 171b of the color filter layer 17 are formed. The first opening 171a of the color filter layer 17 corresponds to the first opening 161a of the first passivation layer 16 to expose the corresponding source and drain electrode of the second metal layer 14. The second opening 171b of the color filter layer 17 corresponds to the second opening 161b of the first passivation layer 16 and the insulator opening 131 of the insulating layer 13 to expose the corresponding connecting electrode 122. Herein, the second opening 171b of the color filter layer 17 can be formed together with the insulator opening 131 and the second opening 161b of the first passivation layer 16, or the second opening 171b and the insulator opening 131 as well as the second opening 161b are formed in different etching steps. Preferably, the bottom area (diameter) of the first opening 171a of the color filter layer 17 is equal to or larger than the top area (diameter) of the first opening 161a of the first passivation layer 16; the bottom area (diameter) of the second opening 171b of the color filter layer 17 is equal to or larger than the top area (diameter) of the second opening 161b of the first passivation layer 16; and the axes of the second opening 171b of the color filter layer 17, the insulator opening 131 and the second opening 161b of the first passivation layer 16 substantially overlap with each other. Herein, the process for patterning the color filter layer 17 can be any patterning process generally used in the art to form a color filter layer 17 comprising red pixels, green pixels and blue pixels. However, in other embodiments, colors of pixels of the color filter layer 17 are not limited thereto.

Then, a patterned first electrode layer 181 is formed on the color filter layer 17. The first electrode layer 181 in the display region C further extends to the second opening 171b of the color filter layer 17, the second opening 161b of the first passivation layer 16 and the insulator opening 131 to electrically connect with the connecting electrode 122.

A second passivation layer 19 is formed to cover surfaces of the first electrode layer 181 and the color filter layer 17. Then, the second passivation layer 19 is etched by a conventional process such as a photolithography process to form a first opening 191a of the second passivation layer 19 in the active element region T. The first opening 191a of the second passivation layer 19 corresponds to the first opening 161a of the first passivation layer 16 and the first opening 171a of the color filter layer 17 to expose the source and drain electrode of the second metal layer 14. It should be noted that the axis of the first opening 191a of the second passivation layer 19 is not aligned with the first opening 171a of the color filter layer 17, in order to reduce the aperture area and ensure the continuity of the etched inclined plane which is related to the accuracy of electrode connection. As shown in FIG. 1, the axis of the first opening 191a of the second passivation layer 19 slightly left-shifts from the first opening 171a of the color filter layer 17, so there is no undercut found in the right inclined plane of the opening region. Therefore, the upper electrode (i.e. second electrode layer 182) can successfully connect with the bottom electrode (i.e. the second metal layer 14). On the other hand, in the left inclined plane of the opening region, an undercut that the left side of the first opening 161a of the first passivation layer 16 exceeds that of the first opening 171a of the color filter layer 17 is formed due to the difference of the etching rates between the color filter layer 17 and the passivation layer (i.e. the first passivation layer 16 and the second passivation layer 19). Especially, when the passivation layer is etched, the etching rate of the color filter layer 17 is slower than that of the passivation layer. In this case, the color filter layer 17 unprotected with the second passivation layer 19 is exposed. Preferably, the bottom area (diameter) of the first opening 191a of the second passivation layer 19 is equal to or smaller than the top area (diameter) of the first opening 171a of the color filter layer 17.

In another process, the step for forming the first opening 161a of the first passivation layer 16 is omitted. In this process, only the second opening 161b of the first passivation layer 16 is firstly formed, and then the first opening 161a of the first passivation layer 16 is formed at the same time when the second passivation layer 19 is etched to form the first opening 191a thereof. In other word, the first opening 191a of the second passivation layer 19 corresponds to the first opening 171a of the color filter layer 17 in off-axis, and the first passivation layer 16 and the second passivation layer 19 are etched at the same time to expose the second metal layer 14. In this process, the undercut which causes the color filter layer 17 unprotected with the second passivation layer 19 is also observed.

In the present embodiment, the materials of the first passivation layer 16, the second passivation layer 19 and the insulating layer 13 can be any passivation layer material used in the art such as SiNx or SiOx, which can be formed in a single layer or multiple layers, and the materials of the first passivation layer 16, the second passivation layer 19 and the insulating layer 13 can be identical to or different from each other. In the present embodiment, SiNx is used to form the first passivation layer 16, the second passivation layer 19 and the insulating layer 13. However, in other embodiments, the materials thereof can be materials other than SiNx.

Then, as shown in FIG. 1, a second electrode layer 182 is formed in the active element region T and the display region C. In the active element region T, the second electrode layer 182 extends from an upper surface of the second passivation layer 19 to the first opening 191a of thereof to electrically connect to the second metal layer 14. When the second metal layer 14 is a three-layered electrode layer, comprising a MoN layer 141, an Al layer 142, and a MoN layer 143, in advance of forming the second electrode layer 182, an opening 1431 is formed in the MoN layer 143 to expose the Al layer 142 during the etching process for forming the first opening 161a of the first passivation layer 16 or the first opening 191a of the second passivation layer 19, and then the sequential formed second electrode layer 182 is electrically connected to the Al layer 142 to obtain a better electrical connection between the second electrode layer 182 and the second metal layer 14, as shown in FIG. 2.

As shown in FIG. 1, the second electrode layer 182 electrically connects to the second metal layer 14, so it is used as a pixel electrode layer. The first electrode layer 181 is used as a common electrode layer. The voltage applied between the second electrode layer 182 and the first electrode layer 181 can form a fringe field to introduce the orientation of liquid crystals in the predetermined space 31 to show a grayscale image. Herein, the common electrode layer (i.e. the first electrode layer 181) can be a planer electrode layer or a finger-shaped electrode layer generally used in the art, and the pixel electrode layer (i.e. the second electrode layer 182) can be a finger-shaped electrode layer, an L-shaped electrode layer, an intersecting striped electrode layer or a saw-shaped electrode layer generally used in the art. However, the present invention is not particularly limited thereto. In addition, the materials for forming the first electrode layer 181 and the second electrode layer 182 can be any transparent conductive material generally used in the art, such as a transparent electrode material using metal oxides (such as ITO and IZO).

Then, a light-shielding layer 41 is formed, which comprises: a filling part 411 and a supporting part 412. The filling part 411 can be disposed in the first opening 191a of the second passivation layer 19 in the active element region T and the second opening 171b of the color filter layer 17 in the display region C. Especially, in the active element region T, the image sticking problem, that materials or contaminants of the color filter layer 17 without protecting by the second passivation layer 19 or the second electrode layer 182 may gradually permeate into the liquid crystal layer to pollute the liquid crystals, can be solved by disposing the filling part 411 into the first opening 191a of the second passivation layer 19. In addition, the reduced contrast causing by the reflective light from the second metal layer 14 or the first metal layer 12 can also be improved. Preferably, the bottom area of the filling part 411 in the active element region T is larger than the top area of the first opening 191a of the second passivation layer 19, and the filling part 411 completely covers all the exposed layers below the top of the first opening 191a of the second passivation layer 19, and especially the route that the exposed color filter layer 17 permeating into the liquid crystal layer to prevent the liquid crystals being polluted. Preferably, the bottom area of the filling part 411 in the display region C is larger than the bottom area of the connecting electrode 122 to cover the same. In the present embodiment, the filling part 411 is also disposed in the openings in the display region C. However, the filling part 411 may be not disposed in the openings in the display region C in other embodiments.

In addition, the supporting part 412 of the light-shielding layer 41 is disposed between the second passivation layer 19 (more specifically, the second electrode layer 182) and the second substrate 21 to form a predetermined space 31 therebetween with a cell gap, wherein liquid crystals are disposed in this predetermined space 31. Herein, the supporting part 412 can further be used as the conventional black matrix. Hence, the supporting part 412 has to correspond to the active element region T, especially the semiconductor layer 15 in the active element region T, in order to prevent photo leakage current which may influence the character of TFT.

Furthermore, in the present embodiment, the material of the light-shielding layer 41 can be any material that can absorb backlight and does not cause liquid crystals being polluted. For example, black resins such as black polystyrene (Black PS) resin or polymers as well as monomers with carbon additives can be used herein. However, the present invention is not particularly limited thereto. In addition, the light-shielding layer 41 can be formed by a two photo mask process or a halftone mask process. When the two photo mask process is used to form the light-shielding layer 41, the first photo mask is used to form the filling part 411 thereof, and the second photo mask is used to form the supporting part 412 thereof. When the halftone mask process is used to form the light-shielding layer 41, the filling part 411 and the supporting part 412 thereof can be formed simultaneously. In addition, a connecting part 413 can be selectively disposed between the filling part 411 and the supporting part 412 for connecting, light-shielding or leveling.

In the present embodiment, a second substrate 21 is disposed opposite to the first substrate 11, and the material thereof can be any upper substrate material generally used in the art. For example, the second substrate 21 can be a transparent substrate such as a glass substrate, a quartz substrate and a plastic substrate. In addition, a side of the second substrate 21 can further be disposed with a shield electrode 22, which can shield static electricity to prevent short circuits in liquid crystals or electrode layers. The material thereof can be the same material as those used in the first electrode layer 181 and the second electrode 182.

Embodiment 2

Figure 3:
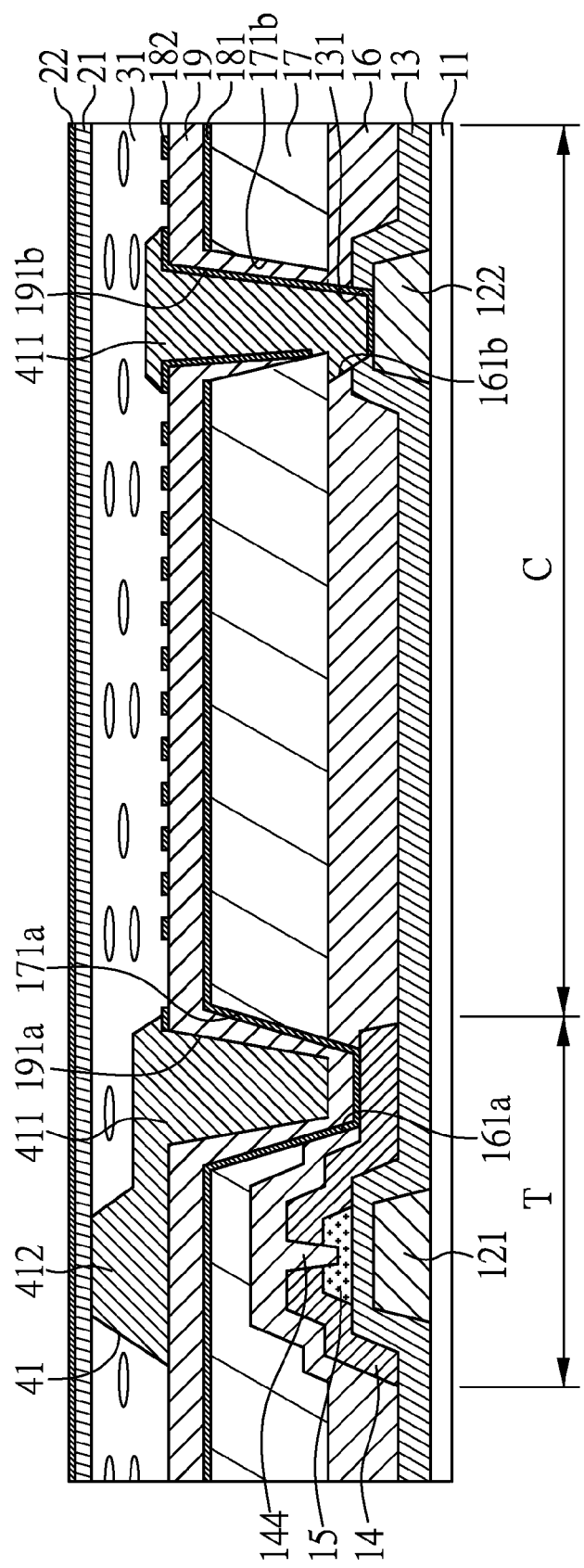
FIG. 3 is a cross-sectional view of an LCD panel according to Embodiment 2 of the present invention.

As shown in FIG. 3, the LCD panel of the present embodiment comprises: a first substrate 11 with a connecting electrode 122 formed thereon; an insulating layer 13 disposed on the connecting electrode 122 and having an insulator opening 131; a first passivation layer 16 disposed on the insulating layer 13 and covering the connecting electrode 122, wherein the first passivation layer 16 has a second opening 161b corresponding to the insulator opening 131; a color filter layer 17 disposed on the first passivation layer 16 and having a second opening 171b corresponding to the second opening 161b of the first passivation layer 16 and the insulator opening 131; a first electrode layer 181 disposed on the color filter layer 17; a second passivation layer 19 disposed on the first electrode layer 181 and covering partial sidewall of the second opening 171b of the color filter layer 17, wherein the second passivation layer 19 has a second opening 191b corresponding to the second opening 171b of the color filter layer 17, the second opening 161b of the first passivation layer 16 and the insulator opening 131 to expose the connecting electrode 122; a second electrode layer 182 disposed on the second passivation layer 19, covering a sidewall of the second opening 191b of the second passivation layer 19 and electrically connecting to the connecting electrode 122, wherein the second electrode layer 182 electrically separates from the first electrode layer 181; a second substrate 21 opposite to the first substrate 11; and a light-shielding layer 41 comprising a filling part 411 and a supporting part 412, and disposed between the first substrate 11 and the second substrate 21, wherein the filling part 411 is disposed in second opening 191b of the second passivation layer 19 and covers the exposed part of the color filter layer 17, and the supporting part 412 is disposed between the second passivation layer 19 and the second substrate 21 to form a predetermined space 31 therebetween for disposing liquid crystals therein.

Hereinafter, a detail structure of the LCD panel of the present embodiment is described. As shown in FIG. 3, the LCD panel of the present embodiment further comprises an active element region T, which comprises: a gate electrode 121, an insulating layer 13, a semiconductor layer 15 and a second metal layer 14, wherein the gate electrode 121 is disposed on the first substrate 11, the insulating layer 13 is disposed on the first substrate 11 and covers the gate electrode 121, the semiconductor layer 15 is disposed on the insulating layer 13, and the second metal layer 14 as a source electrode and a drain electrode is disposed on two corresponding sides of the semiconductor layer 15. Herein, a gap is formed between the source electrode and the drain electrode of the second metal layer 14 to define a channel region 144. Herein, each layer in the active element region T can be formed by any conventional process for TFT, so the description thereof is omitted herein.

In addition, as shown in FIG. 3, the gate electrode 121 in the active element region T and the connecting electrode 122 in the display region C can be formed with the same process. Furthermore, the insulating layer 13 covers the gate electrode 121 and the connecting electrode 122 when that is formed in the active element region T.

After the TFI in the active element region T is formed, a surface of the second metal layer 14 is covered with a first passivation layer 16. Herein, the first passivation layer 16 also covers the insulating layer 13 both in the display region C and on the connecting electrode 122. After the conventional patterning process used in the art, an insulator opening 131 is formed in the insulating layer 13 and a second opening 161b of the first passivation layer 16 is formed in the display region C to expose the connecting electrode 122. The insulator opening 131 and the second opening 161b of the first passivation layer 16 can be formed simultaneously, and the bottom area of the second opening 161b of the first passivation layer 16 is larger or equal to the top area of the insulator layer 13. In other embodiment, the insulator opening 131 and the second opening 161b of the first passivation layer 16 can be formed in different steps, wherein the insulator layer 13 is firstly patterned to form the insulator opening 131, and then the second opening 161b of the first passivation layer 16 corresponding to the insulator opening 131 is formed. The axes of the insulator opening 131 and the second opening 161b of the first passivation layer 16 substantially overlap with each other. After the patterning process, a first opening 161a of the first passivation layer 16 is also formed to expose the second metal layer 14 for the source and drain electrode.

After the openings of the first passivation layer 16 formed, a patterned color filter layer 17 is formed on the first passivation layer 16. A first opening 171a of the color filter layer 17 corresponds to the second metal layer 14; and a second opening 171b thereof corresponds to the connecting electrode 122. Especially, the second opening 171b thereof corresponds to the second opening 161b of the first passivation layer 16 and the insulator opening 131 of the insulating layer 13 to expose the corresponding connecting electrode 122. Herein, the second opening 171b of the color filter layer 17 can be formed together with the insulator opening 131 and the second opening 161b of the first passivation layer 16, or the second opening 171b and the insulator opening 131 as well as the second opening 161b are formed in different etching steps. Preferably, the bottom area (diameter) of the second opening 171b of the color filter layer 17 is equal to or larger than the top area (diameter) of the second opening 161b of the first passivation layer 16. Then, a patterned first electrode layer 181 is formed on the color filter layer 17. The first electrode layer 181 in the active element region T extends to the first opening 171a of the color filter layer 17 and the first opening 161a of the first passivation layer 16 to electrically connect with the second metal layer 14.

A second passivation layer 19 is formed to cover surfaces of the first electrode layer 181 and the color filter layer 17. Then, the second passivation layer 19 is etched by a conventional process such as a photolithography process to form a second opening 191b of the second passivation layer 19 in the display region C to expose the connecting electrode 122. It should be noted that the axis of the second opening 191b of the second passivation layer 19 is not aligned with that of the second opening 171b of the color filter layer 17, in order to reduce the aperture area. In other word, the axis of the second opening 171b of the color filter layer 17 is not aligned with those of the second opening 161b of the first passivation layer 16, the insulator opening 131 and the second opening 191b of the second passivation layer 19. In addition, the second opening 161b of the first passivation layer 16, the insulator opening 131 and the second opening 191b of the second passivation layer 19 can be formed with identical etching process, and the axes thereof are aligned with each other. In this case, the sequential formed second electrode layer can laterally electrically connect to the connecting electrode 122. In the display region C, an undercut is observed in the second opening 161b of the first passivation layer 16 and the insulator opening 131 (the left side of the second opening 161b in FIG. 2) due to the difference of the etching rates between the color filter layer 17 and the passivation layer 19. In this case, parts of the color filter layer 17 unprotected with the second passivation layer 19 is exposed.

Then, as shown in FIG. 3, a second electrode layer 182 is formed. In the display region C, the second electrode layer 182 extends from an upper surface of the second passivation layer 19 to the second opening 191b of the second passivation layer 19 to electrically connect to the connecting electrode 122.

In the present embodiment, the second electrode layer 182 electrically connects to the connecting electrode 122, so it is used as a common electrode layer. The first electrode layer 181 is used as a pixel electrode layer. Herein, the common electrode layer (i.e. the second electrode layer 182) can be any patterned electrode layer generally used in the art, and the pixel electrode layer (i.e. the first electrode layer 181) can be a planer electrode layer (unpatterned electrode layer) generally used in the art. However, the present invention is not particularly limited thereto.

Then, a light-shielding layer 41 is formed, which comprises: a filling part 411 and a supporting part 412. The filling part 411 can be disposed in the active element region T and the second opening 191b of the second passivation layer 19 in the display region C. Especially, in the display region C, the image sticking problem, that materials or contaminants of the color filter layer 17 without protecting by the second passivation layer 19 may gradually permeate into the liquid crystal layer to pollute the liquid crystals, can be solved by disposing the filling part 411 into the second opening 191b of the second passivation layer 19 to cover the exposed color filter layer 17. Both the problems of the light reflectance causing by the metal layer in the active element region T and the photo leakage current in the channel region 144 of the semiconductor layer 15 can also be solved. In the present embodiment, the filling part 411 also disposed in the openings in the active element region T. However, in other embodiments, the first opening 191a in the active element region T does not have to be filled with the filling part 411.

In addition, the supporting part 412 of the light-shielding layer 41 is disposed between the second passivation layer 19 (more specifically, the second electrode layer 182) and the second substrate 21 to form a predetermined space 31 therebetween with a cell gap, wherein liquid crystals are disposed in this predetermined space 31. Furthermore, the supporting part 412 can also functions as the conventional black matrix. Hence, the supporting part 412 has to correspond to the active element region T, especially the semiconductor layer 15 in the active element region T.

The materials and the processes for each elements and layers of the LCD panel of the present embodiment are the same as those illustrated in Embodiment 1, and therefore the descriptions thereto are omitted herein.

Embodiment 3

Figure 4:
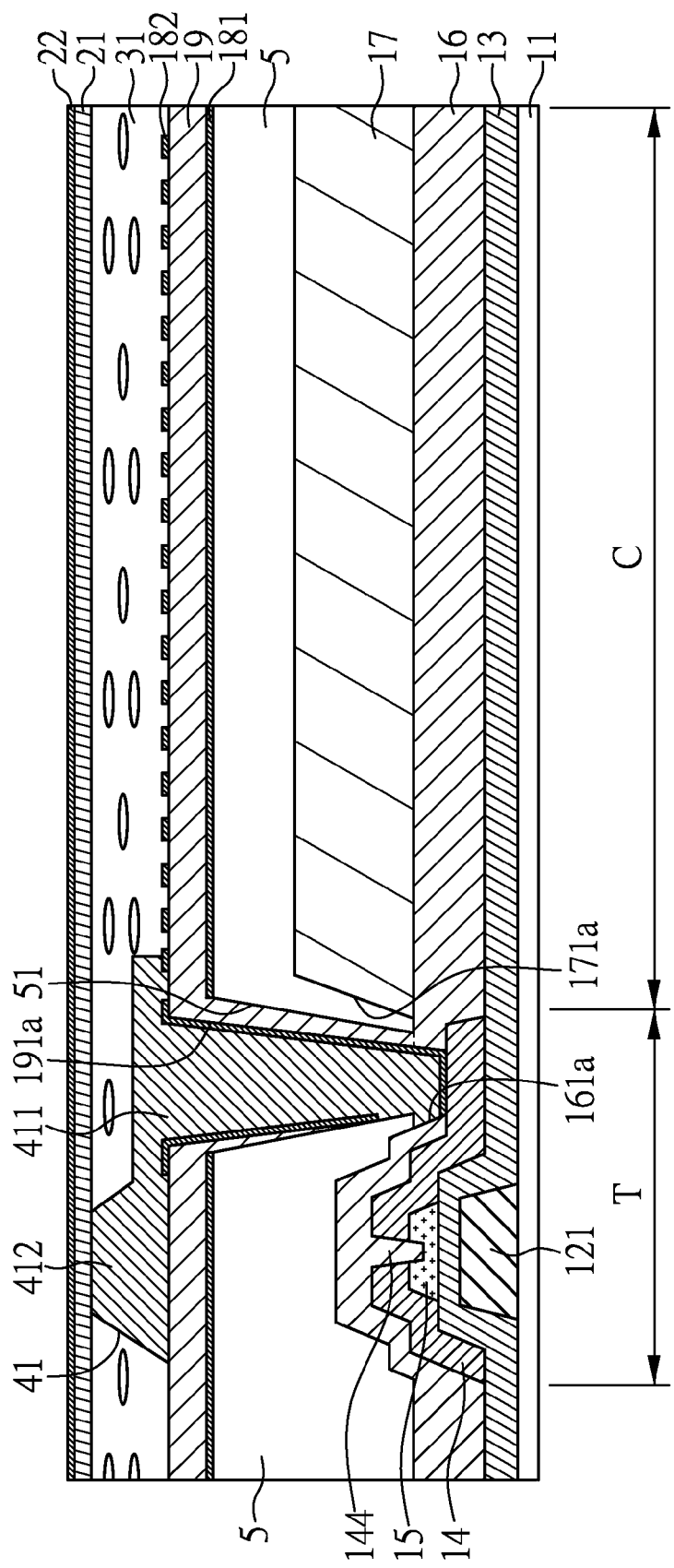
FIG. 4 is a cross-sectional view of an LCD panel according to Embodiment 3 of the present invention.

As shown in FIG. 4, the LCD panel of the present embodiment is similar to that of Embodiment 1, except the following differences. The LCD panel of the present embodiment further comprises a patterned planer layer 5. In the visible region C, the planer layer 5 is disposed between the color filter layer 17 and the first electrode layer 181. In addition, the color filter layer 17 is not disposed on the first passivation layer 16, and the planer layer 5 is directly disposed on the first passivation layer 16 in the active element region T. Herein, materials for the planer layer 5 can be any material generally used in the art, such as PEN, PMMA, PI, $Al_2O_3$, oxides (for example, SiOx) or nitrides (for example, SiNx).

Embodiment 4

Figure 5:
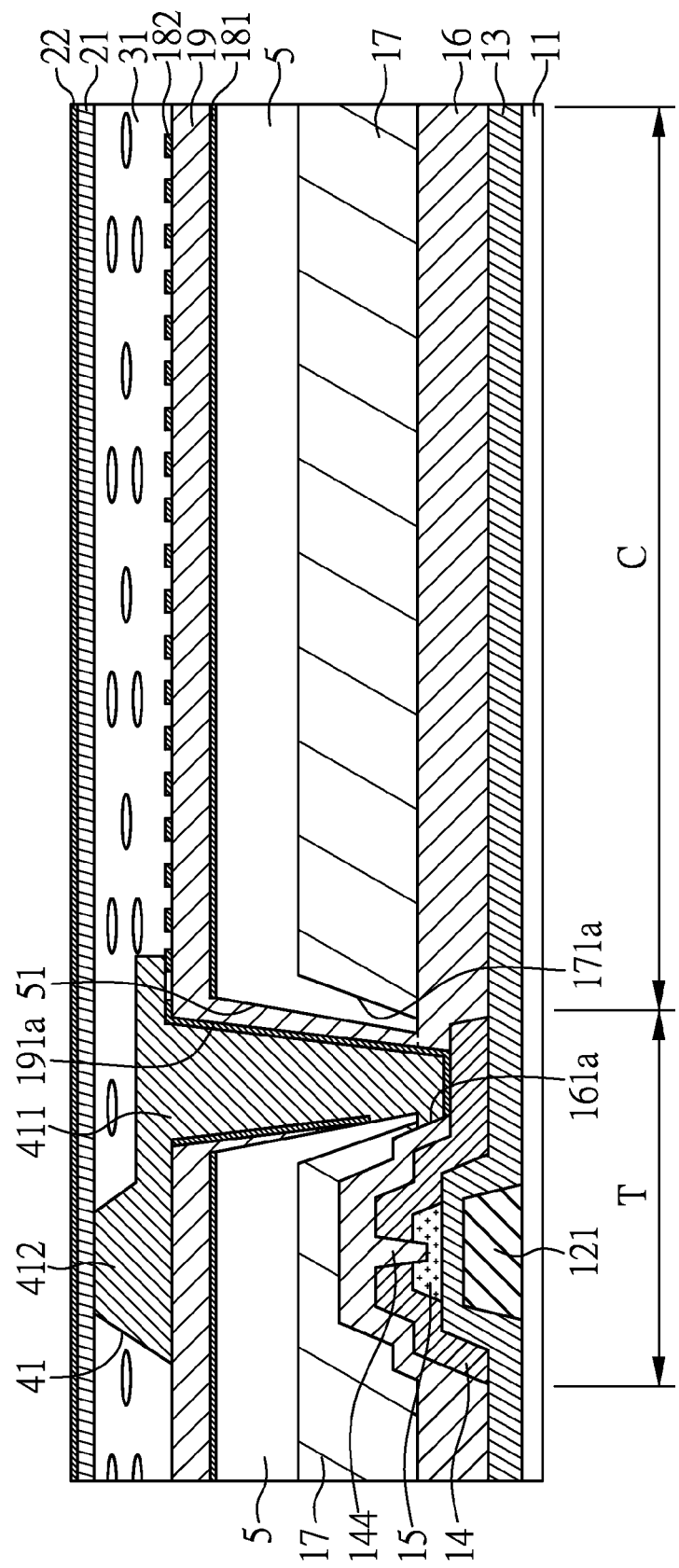
FIG. 5 is a cross-sectional view of an LCD panel according to Embodiment 4 of the present invention.

As shown in FIG. 5, the LCD panel of the present embodiment is similar to that of Embodiment 1, except the following differences. The LCD panel of the present embodiment further comprises a patterned planer layer 5 disposed between the color filter layer 17 and the first electrode layer 181 both in the visible region C and the active element region T. Herein, the material of the planer layer 5 is identical to that used in Embodiment 3, and therefore the descriptions thereto are omitted herein.

Embodiment 5

Figure 6:
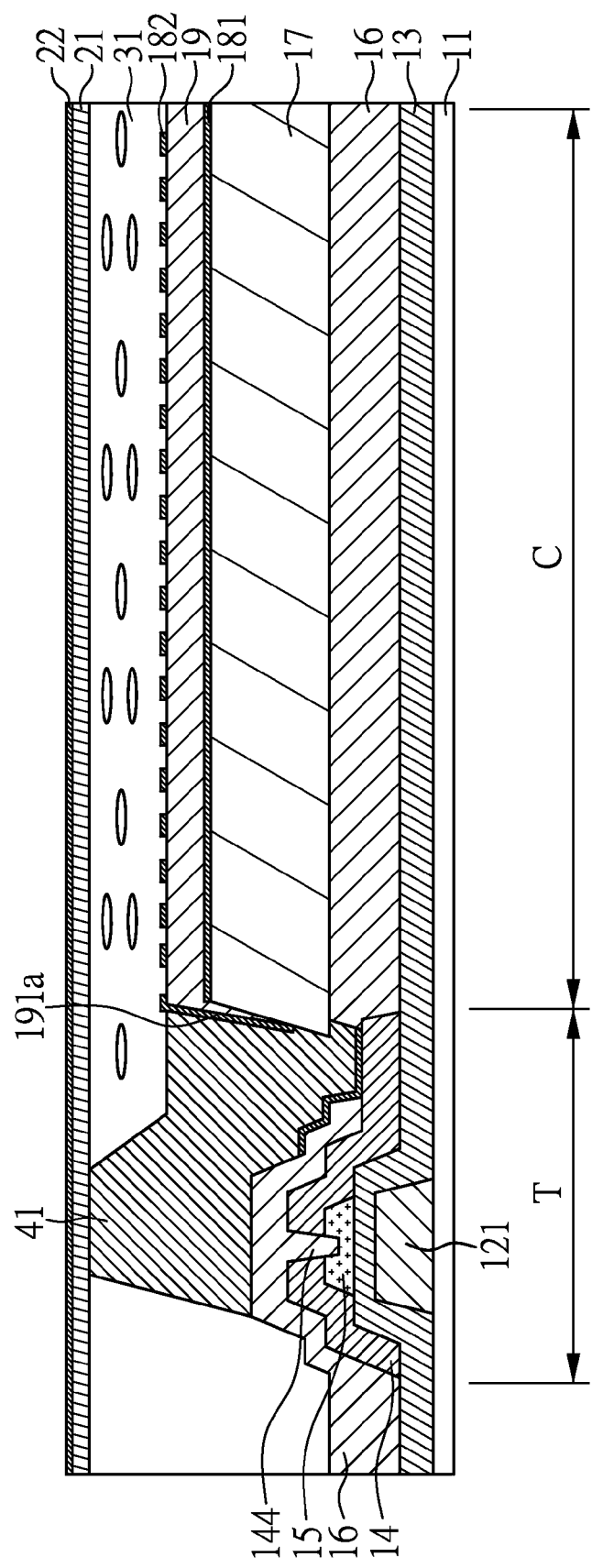
FIG. 6 is a cross-sectional view of an LCD panel according to Embodiment 5 of the present invention.

As shown in FIG. 6, the LCD panel of the present embodiment is similar to that of Embodiment 1, except the following differences. There are no color filter layer 17 and the second electrode layer 182 formed in the active element region T, and the light-shielding layer 41 directly covers the exposed color filter layer 17, parts of the first electrode layer 181 and the channel region 144 of the semiconductor layer 15. Herein, the material of the light-shielding layer 41 is identical to that used in Embodiment 1, and therefore the descriptions thereto are omitted herein.

FIG. 6 is a cross-sectional view of the LCD panel of the present embodiment according to a single cross-hatching line, which is used to show the undercut observed in the color filter layer 17 and the first passivation layer 16. However, when the LCD panel of the present embodiment is presented according to another cross-hatching line, the second electrode layer 182 extends from an upper surface of the second passivation layer 19 to the first opening 191a of the second passivation layer 19 to electrically connect to the second metal layer 14 (not shown in the figure).

Embodiment 6

Figure 7:
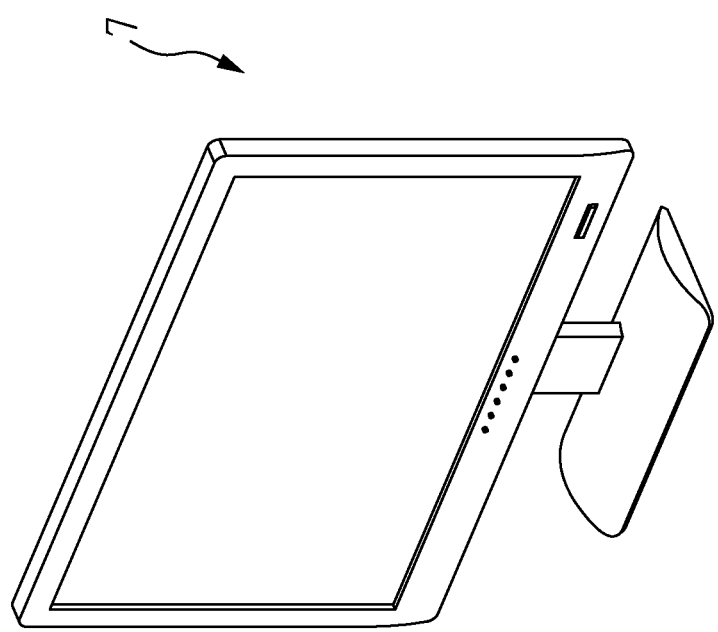
FIG. 7 is a perspective view of an LCD device according to Embodiment 6 of the present invention.

FIG. 7 is a perspective view of the LCD device of the present embodiment, which comprises: any one of the LCD panels described in Embodiments 1-5; and other elements for forming the LCD device such as external containers, driving elements, and backlight modules.

Figure 9:
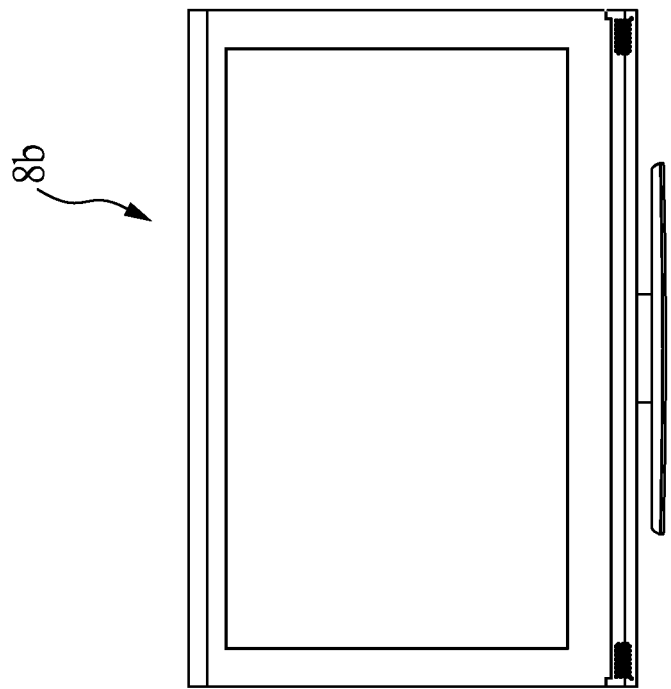
FIG. 9 is a perspective view of a TV according to the present invention.
Figure 8:
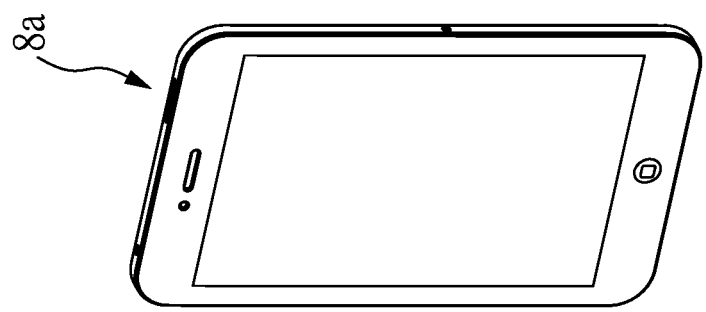
FIG. 8 is a perspective view of a cell phone according to the present invention.
Figure 10:
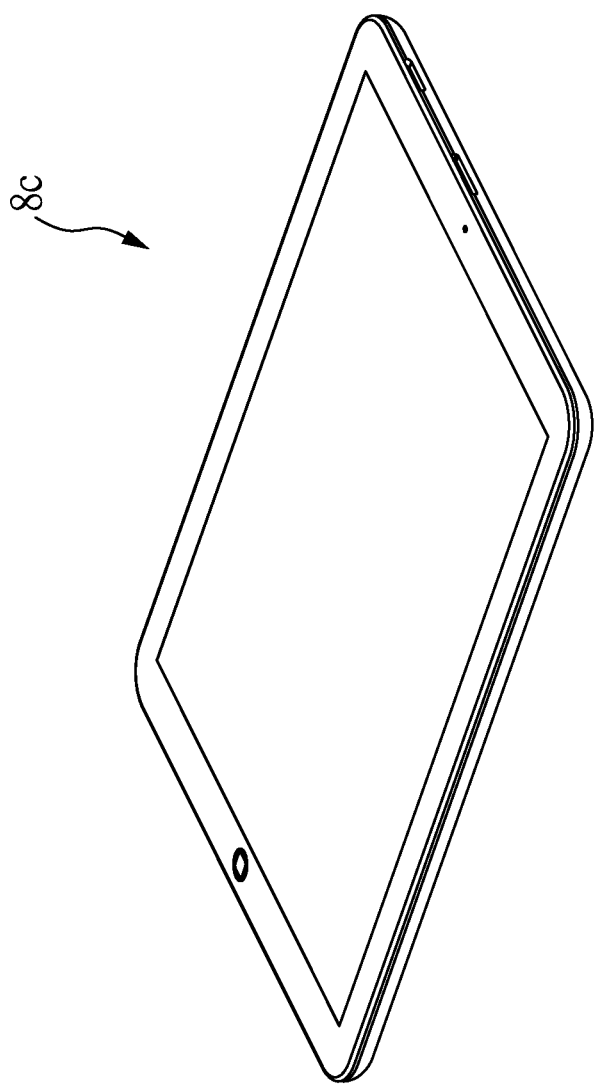
FIG. 10 is a perspective view of a tablet PC according to the present invention.

In addition, the LCD panels described in Embodiments 1-5 can also be applied to electronic devices other than the LCD device, for example, a cell phone 8*a* shown in FIG. 8, a TV 8*b* shown in FIG. 9, and a tablet PC 8*c* shown in FIG. 10.

Although the present invention has been explained in relation to its preferred embodiment, it is to be understood that many other possible modifications and variations can be made without departing from the spirit and scope of the invention as hereinafter claimed.

What is claimed is:

1. A liquid crystal display panel, comprising:
   a first substrate with a metal layer formed thereon;
   a first passivation layer disposed on the metal layer;
   a color filter layer disposed on the first passivation layer and having a first opening;
   a first electrode layer disposed on the color filter layer;
   a second passivation layer disposed on the first electrode layer and covering partial sidewall of the first opening of the color filter layer, wherein the second passivation layer has a second opening corresponding to the first opening to expose the metal layer;
   a second electrode layer disposed on the second passivation layer, covering a sidewall of the second opening, and electrically connecting to the metal layer;
   a second substrate opposite to the first substrate; and
   a light-shielding layer comprising a filling part and a supporting part, and disposed between the first substrate and the second substrate,
   wherein the filling part is disposed in the second opening and covers the color filter layer exposed from the second passivation layer and the second electrode, and the supporting part is disposed between the second substrate and the first passivation layer or the second passivation layer to form a space therebetween for disposing liquid crystal therein.

2. The liquid crystal display panel as claimed in claim 1, further comprising an active element region, which comprises: a gate electrode layer, an insulating layer, a semiconductor layer, and a source and drain electrode layer formed by the metal layer, wherein the gate electrode is disposed on the first substrate, the insulating layer is disposed on the first substrate and covering the gate electrode layer, the semiconductor layer is disposed on the insulating layer, and a source electrode and a drain electrode of the source and drain electrode layer are respectively disposed at two corresponding sides of the semiconductor layer.

3. The liquid crystal display panel as claimed in claim 2, wherein the supporting part of the light-shielding layer corresponds to the semiconductor layer.

4. The liquid crystal display panel as claimed in claim 2, wherein the first electrode layer is a common electrode layer, and the second electrode layer is a pixel electrode layer.

5. The liquid crystal display panel as claimed in claim 1, further comprising an insulating layer, wherein the insulating layer is disposed on the first substrate and covers the metal layer, the metal layer is a connecting electrode layer, the insulating layer has a third opening to expose the connecting electrode layer, and the second electrode layer is used as a common electrode layer.

6. The liquid crystal display panel as claimed in claim 5, further comprising an active element region, which comprises: a gate electrode layer, a semiconductor layer, and a source and drain electrode layer, wherein the gate electrode is disposed on the first substrate, the insulating layer covers the gate electrode layer, the semiconductor layer is disposed on the insulating layer, and the source and drain electrode layer is disposed on the semiconductor layer.

7. The liquid crystal display panel as claimed in claim 6, wherein the first electrode layer is a pixel electrode layer and electrically connects to the source and the drain electrode layer.

8. The liquid crystal display panel as claimed in claim 6, wherein the supporting part of the light-shielding layer corresponds to the semiconductor layer.

9. The liquid crystal display panel as claimed in claim 1, wherein a material of the light-shielding layer is a black resin.

10. The liquid crystal display panel as claimed in claim 1, further comprising: a planer layer disposed between the color filter layer and the first electrode.

11. The liquid crystal display panel as claimed in claim 2, wherein the color filter layer is not disposed in the active element region.

12. A liquid crystal display device, comprising:
   a driving unit;
   a backlight unit; and
   a liquid crystal display panel, comprising:
      a first substrate with a metal layer formed thereon;
      a first passivation layer disposed on the metal layer;
      a color filter layer disposed on the first passivation layer and having a first opening;
      a first electrode layer disposed on the color filter layer;
      a second passivation layer disposed on the first electrode layer and covering partial sidewall of the first opening, wherein the second passivation layer has a second opening corresponding to the first opening to expose the metal layer;
      a second electrode layer disposed on the second passivation layer, covering a sidewall of the second opening of the second passivation layer, and electrically connecting to the metal layer;
      a second substrate opposite to the first substrate; and
      a light-shielding layer comprising a filling part and a supporting part, and disposed between the first substrate and the second substrate, wherein the filling part is disposed in the second opening and covers the color filter layer exposed from the second passivation layer and the second electrode, and the supporting part is disposed between the second substrate and the first passivation layer or the second passivation layer to form a space therebetween for disposing liquid crystal therein.

13. The liquid crystal display device as claimed in claim 12, further comprising an active element region, which comprises: a gate electrode layer, an insulating layer, a semiconductor layer, and a source and drain electrode layer formed by the metal layer, wherein the gate electrode is disposed on the first substrate, the insulating layer is disposed on the first substrate and covering the gate electrode layer, the semiconductor layer is disposed on the insulating layer, and the source and drain electrode layer is disposed on the semiconductor layer.

14. The liquid crystal display device as claimed in claim 13, wherein the supporting part of the light-shielding layer corresponds to the semiconductor layer.

15. The liquid crystal display device as claimed in claim 12, further comprising an insulating layer, wherein the insulating layer is disposed on the first substrate and covers the metal layer, the metal layer is a connecting electrode layer, the insulating layer has a third opening to expose the connecting electrode layer, and the second electrode layer is used as a common electrode layer.

16. The liquid crystal display device as claimed in claim 15, further comprising an active element region, which comprises: a gate electrode layer, a semiconductor layer, and a source and drain electrode layer, wherein the gate electrode is disposed on the first substrate, the insulating layer covers the gate electrode layer, the semiconductor layer is disposed on the insulating layer, and the source and drain electrode layer is disposed on the semiconductor layer.

17. The liquid crystal display device as claimed in claim 16, wherein the supporting part of the light-shielding layer corresponds to the semiconductor layer.

18. The liquid crystal display device as claimed in claim 12, further comprising: a planer layer disposed between the color filter layer and the first electrode.

* * * * *